US009283731B2

(12) United States Patent
Leonhard et al.

(10) Patent No.: US 9,283,731 B2
(45) Date of Patent: Mar. 15, 2016

(54) TOUCH SCREEN PROTECTOR

(71) Applicant: AEVOE INTERNATIONAL LTD., Tortola (VG)

(72) Inventors: Michael Leonhard, San Francisco, CA (US); Jonathan Lin, Mountain View, CA (US); Steven Huang, Taipei (TW)

(73) Assignee: AEVOE INTERNATIONAL LTD., Tortola (VG)

(*) Notice: Subject to any disclaimer, the term of this patent is extended or adjusted under 35 U.S.C. 154(b) by 50 days.

(21) Appl. No.: 13/841,337

(22) Filed: Mar. 15, 2013

(65) Prior Publication Data

US 2013/0316112 A1 Nov. 28, 2013

Related U.S. Application Data

(60) Provisional application No. 61/650,317, filed on May 22, 2012.

(51) Int. Cl.
*B32B 7/06* (2006.01)
*B32B 7/12* (2006.01)
(Continued)

(52) U.S. Cl.
CPC ... *B32B 7/06* (2013.01); *B32B 3/10* (2013.01); *B32B 7/12* (2013.01); *C09J 7/0264* (2013.01);
(Continued)

(58) Field of Classification Search
CPC ............ B32B 7/06; B32B 7/12; B32B 3/10; C09J 7/0264; C09J 7/0296; G06F 1/1626
USPC .......... 428/1.1, 1.3, 1.5, 40.1, 141, 143, 189, 428/195.1, 201, 202, 323, 343, 38, 192; 345/173; 349/56
See application file for complete search history.

(56) References Cited

U.S. PATENT DOCUMENTS 3,948,662 A 4/1976 Alston, Jr. et al. ............ 396/586
3,950,580 A 4/1976 Boudet
(Continued)

FOREIGN PATENT DOCUMENTS

CN 1522024 A 8/2004
CN 201203726 Y 3/2009
(Continued)

OTHER PUBLICATIONS

International Search Report and Written Opinion, Appl. No. PCT/US2013/040113, Aug. 21, 2013.
(Continued)

*Primary Examiner* — Maria Veronica Ewald
*Assistant Examiner* — Joanna Pleszczynska
(74) *Attorney, Agent, or Firm* — Novak Druce Connolly Bove + Quigg LLP

(57) ABSTRACT

The invention relates to a touch screen protector for a hand held electronic device having a front face that includes a touch screen portion and a non-functional band. The touch screen protector of the invention comprises a film having front and back sides, an outer perimeter that corresponds to that of the device, and a transparent window; an exposed adhesive or adhesive/spacer provided along the outer perimeter of the film surrounding the transparent window, and multiple dots arranged in a prescribed pitch and present on the back side of the film at a density which is sufficiently high to reduce interference patterns when the transparent window of the protector is pressed against the touch screen portion for operation of the electronic device.

16 Claims, 2 Drawing Sheets

(51) Int. Cl.
*B32B 3/10* (2006.01)
*C09J 7/02* (2006.01)
*G06F 1/16* (2006.01)

(52) U.S. Cl.
CPC ............ *C09J 7/0296* (2013.01); *C09J 2201/28* (2013.01); *C09J 2203/318* (2013.01); *G06F 1/1626* (2013.01); *Y10T 156/10* (2015.01); *Y10T 428/1405* (2015.01); *Y10T 428/24322* (2015.01); *Y10T 428/24372* (2015.01); *Y10T 428/24802* (2015.01); *Y10T 428/24959* (2015.01); *Y10T 428/25* (2015.01); *Y10T 428/28* (2015.01); *Y10T 428/2848* (2015.01)

(56) References Cited

U.S. PATENT DOCUMENTS

| | | | |
|---|---|---|---|
| 4,889,754 A | 12/1989 | Vargas | |
| 4,907,090 A | 3/1990 | Ananian | 358/247 |
| 5,132,588 A | 7/1992 | Warman | 313/479 |
| 5,486,883 A | 1/1996 | Candido | 353/120 |
| 5,668,612 A | 9/1997 | Hung | 348/818 |
| 6,250,765 B1 | 6/2001 | Murakami | 359/609 |
| 6,469,752 B1 | 10/2002 | Ishikawa et al. | 348/834 |
| 6,536,589 B2 | 3/2003 | Chang | 206/320 |
| 6,555,235 B1 | 4/2003 | Aufderheide et al. | 428/447 |
| 6,559,902 B1 | 5/2003 | Kusuda et al. | 349/12 |
| 6,592,950 B1 | 7/2003 | Toshima et al. | 428/1.1 |
| 6,614,423 B1 | 9/2003 | Wong et al. | 345/173 |
| 6,667,738 B2 | 12/2003 | Murphy | 345/173 |
| 6,721,019 B2 | 4/2004 | Kono et al. | 349/12 |
| 6,750,922 B1 | 6/2004 | Benning | 348/818 |
| 6,777,055 B2 | 8/2004 | Janssen et al. | 428/41.8 |
| 6,864,882 B2 | 3/2005 | Newton | 345/173 |
| 6,879,319 B2 | 4/2005 | Cok | 345/173 |
| 6,995,976 B2 | 2/2006 | Richardson | 361/681 |
| 7,034,877 B2 | 4/2006 | Schmidt | 348/333.01 |
| 7,070,837 B2 | 7/2006 | Ross | 428/1.1 |
| 7,226,176 B1 | 6/2007 | Huang | 359/609 |
| 7,495,895 B2 | 2/2009 | Carnevali | 361/681 |
| 8,044,942 B1 | 10/2011 | Leonhard et al. | 345/173 |
| 2002/0101411 A1 | 8/2002 | Chang | 345/179 |
| 2002/0114934 A1 | 8/2002 | Liu et al. | |
| 2002/0122925 A1 | 9/2002 | Liu et al. | 428/212 |
| 2002/0154099 A1 | 10/2002 | Oh | 345/173 |
| 2002/0195910 A1 | 12/2002 | Hus et al. | 312/223.2 |
| 2003/0012936 A1 | 1/2003 | Draheim et al. | 428/216 |
| 2003/0087054 A1 | 5/2003 | Janssen et al. | 428/40.1 |
| 2003/0110613 A1 | 6/2003 | Ross | 29/592 |
| 2003/0129355 A1 | 7/2003 | Ross | 428/98 |
| 2004/0004605 A1 | 1/2004 | David | 345/173 |
| 2004/0109096 A1 | 6/2004 | Anderson et al. | 348/832 |
| 2004/0227722 A1 | 11/2004 | Friberg et al. | 345/156 |
| 2004/0246386 A1 | 12/2004 | Thomas et al. | 348/818 |
| 2006/0114245 A1 | 6/2006 | Masters et al. | 345/173 |
| 2007/0181456 A1 | 8/2007 | Kusuda et al. | 206/443 |
| 2007/0212508 A1 | 9/2007 | Mase | |
| 2008/0030631 A1 | 2/2008 | Gallagher | 348/818 |
| 2008/0055258 A1 | 3/2008 | Sauers | 345/173 |
| 2008/0062147 A1 | 3/2008 | Hotelling et al. | 345/173 |
| 2008/0302456 A1 | 12/2008 | Cook | 150/154 |
| 2009/0087617 A1* | 4/2009 | Suzuki et al. | 428/147 |
| 2010/0026646 A1 | 2/2010 | Xiao et al. | 345/173 |
| 2010/0092713 A1 | 4/2010 | Bullard et al. | 428/40.1 |
| 2010/0102197 A1 | 4/2010 | McIntyre | 248/687 |
| 2010/0164836 A1 | 7/2010 | Liberatore | 345/1.1 |
| 2010/0208352 A1 | 8/2010 | Onozawa et al. | 359/599 |
| 2010/0238119 A1 | 9/2010 | Dubrovsky et al. | 345/169 |
| 2010/0245273 A1 | 9/2010 | Hwang et al. | 345/173 |
| 2010/0270189 A1 | 10/2010 | Pedersen, II et al. | 206/320 |
| 2011/0102343 A1* | 5/2011 | Imai et al. | 345/173 |
| 2011/0117339 A1* | 5/2011 | Baek et al. | 428/213 |
| 2011/0157056 A1 | 6/2011 | Karpfinger | 345/173 |
| 2011/0279383 A1 | 11/2011 | Wilson et al. | 345/173 |
| 2011/0285932 A1 | 11/2011 | Park | 349/56 |
| 2012/0070603 A1 | 3/2012 | Hsu | 428/41.8 |

FOREIGN PATENT DOCUMENTS

| | | |
|---|---|---|
| CN | 201397689 Y | 2/2010 |
| DE | 198 08 535 A1 | 9/1999 |
| EP | 1 471 415 A2 | 10/2004 |
| EP | 1 548 691 A1 | 6/2005 |
| GB | 2 449 899 A | 12/2008 |
| JP | 2002-328613 A | 11/2002 |
| JP | 2002328613 | 11/2002 |
| TW | 200700793 | 1/2007 |
| TW | M343359 U | 10/2008 |
| TW | 201027992 A1 | 7/2010 |
| TW | M386524 U1 | 8/2010 |
| TW | M400596 U1 | 3/2011 |
| WO | WO 03/052678 A1 | 6/2003 |

OTHER PUBLICATIONS

Non-Final Office Action dated Jan. 16, 2014 for related U.S. Appl. No. 14/078,245, filed Nov. 12, 2013.

Non-Final Office Action dated Nov. 29, 2013 for related U.S. Appl. No. 13/411,372, filed Nov. 29, 2013.

Jake Gaecke, "Appletell reviews the iVisor AG for iPad," appletell.com, Sep. 15, 2010. http://www.appletell.com/apple/comment/appletell-reviews-ivisor-ag-for-ipad.

"What Makes NuShield Screen Protectors Superior," nushield.com. http://www.nushield.com/technology.php.

"Sgp iPhone 4 Screen and Body Protector Set Incredible Shield Series," sgpstore.com. http://www.sgpstore.com/cell-phone/apple-iphone/iphone-4/sgp-iphone-4-screen-body-protector-set-incredible-shield-series.html.

"Sony PCKLM1AM Semi-Hard Plastic LCD Screen Cover Protector for NEX-3, NEX-5, SLT-A33, and SLT-A55 Alpha Camera Models," amazon.com. http://www.amazon.com/Sony-PCKLM1AM-Semi-Hard-Plastic-Protector/dp/B003XFGIKA.

"GGS Optical Glass LCD Screen Protector 3.0," for Sony Cybershot DSC HX1 H10 H20 W230 W290 N1 N2 T100 amazon.com. http://www.amazon.com/Optical-Glass-Screen-Protector-Cybershot/dp/B003ZEXG68.

"Giottos SP8270 Aegis Multi-coated LCD Screen Protector," amazon.com. http://www.amazon.com/Giottos-SP8270-Multi-coated-Screen-Protector/dp/B001940LR8.

"Invisible Gadget Guard, the original," gadgetguard.com. http://www.gadgetguard.com/guard.

"Protect your iPhone 4 with Screen Protectors from Incipio®," incipiotech.com, Jul. 22, 2010. http://incipiotech.com/tag/screen-protectors.

"100% Bubble Free iVisor AG iPad Screen Protector". http://store.moshimonde.com/ivisor-ag-ipad.html, Jul. 2010.

"iVisor XT Crystal Clear Protector for iPad". http://store.moshimonde.com/ivisor-xt-ipad.html, Aug. 2010.

"iVisor AG for iPad 2 Black". http://store.moshimonde.com/ivisorag-for-ipad2-black.html, Mar. 2011.

"iVisor AG for iPad 2 White". http://store.moshimonde.com/ivisorag-for-ipad2-white.html, Mar. 2011.

"iVisor AG for iPhone 4 Black". http://store.moshimonde.com/ivisor-ag-iphone4-black.html, Nov. 2010.

"iVisor AG for iPhone 4 White". http://store.moshimonde.com/ivisor-ag-iphone4-white.html, May 2010.

"Moshi-Zubehor der Extraklasse (inkl. iVisor AG)," Internet, Jul. 23, 2010, XP55013277, http://www.rosenblut.org/2010/07/23/moshi-zubehor-der-extraklasse-inkl-ivisor-ag.

"iVisor Matte iPad Protector with a Bubble Free Guarantee," YouTubeVideo, Dec. 16, 2010, XP55013271, http://www.youtube.com/watch?v=LYnRXZALIVY.

MyMac, "iVisor AG anti-reflective screen protector," Dec. 17, 2009. http://www.mymac.com/2009/12/ivisor-ag-antireflective-screen-protector-review/.

(56) References Cited

OTHER PUBLICATIONS

"The Ultimate MacBook Pro Protection Suite by Moshi," Jul. 7, 2009. http://gigaorn.com/apple/the-ultimate-macbook-pro-protection-suite-by-moshi/.

"iVisor Pro 13 (anti-glare)," Jan. 29, 2012. http://store.moshimonde.com/ivisor-pro-13.html.

Alvaro Serrano, "Review: Moshi iVisor AG—a matte screen protector for the 13" MacBook Pro," Analog Senses, Jul. 3, 2010. http://analogsenses.com/2010/07/03/765525210.

Amazon.com advertisement. "Moshi iVisor AG 13, Anti-Glare Screen Protector for Macbook 13" Unibody". http//amazon.com/iVisor-Anti-Glare-Protector-Macbook-Unibody/dp/B0029TSTT4/ref=cm_cr_pr_product_top.

Amazon.com advertisement. "Moshi Accessories Kit for Apple iPad 2 2nd Generation Tablet (16GB, 32GB, 64GB, Wifi, AT&T 3G, Verizon 3G,) Newest Model Includes iVisor AG (Anti Glare) Screen Protector for iPad 2—White (99MO020909) + TeraGlove Microfiber Screen Cleaner". http://amazon.com/Accessories-Generation-Verizon-Includes-Protector/dp/B005GBLGOK/ref=sr_1_21?ie=UTF8&qid=1340863169&sr=8-21&keywords=ivisor+AG.

Amazon.com advertisement. "2 Pack Moshi iVisor AG Anti-Glare Screen Protector for Apple iPhone 4 & iPhone 4S (White) + MicroFiber Cleaning Cloth". http://amazon.com/Moshi-Anti-Glare-Protector-MicroFiber-Cleaning/dp/B0063GAH9Y.

Office Communication dated Apr. 20, 2012, Reexam. Appl. Control No. 95/001,881.

Response by patentee dated Apr. 27, 2012, Reexam. Appl. Control No. 95/001,881.

Office Communication dated Oct. 2, 2012, Reexam. Appl. Control. No. 95/002,073.

Response to the Inter Parte Re-Examination Request dated Nov. 18, 2012, Reexam. Appl. Control No. 95/002,073.

Third Party Requestor's Comments on the Patent Owner Response dated Dec. 18, 2012, Reexam. Appl. Control No. 95/002,073.

*Aevoe* v. *Splash*, USDC NDCA, Case No. 4:11-cv-06165-CW, Conditional Order of Dismissal, Mar. 23, 2012.

*Aevoe Corp.* v. *Shenzhen Membrane Precise Electron Ltd.*, USDC NV, Case No. 2:12-cv-00054-GMN-PAL, Stipulation and Notice of Voluntary Dismissal, Sep. 17, 2012.

*Aevoe Corp.* v. *PhoneDevil Ltd.*, USDC NV, Case No. 2:12-cv-00514-GMN-PAL, Stipulation and Order for a Permanent Injunction, Jun. 25, 2012.

*Aevoe Corp.* v. *AE Tech Co., Ltd.*, USDC NV, Case No. 2:12-cv-0053-GMN-RJJ, Temporary Restraining Order, Seizure, and Order to Show Cause re: Preliminary Injunction, Jan. 12, 2012.

*Aevoe Corp.* v. *AE Tech Co., Ltd.*, USDC NV, Case No. 2:12-cv-0053-GMN-RJJ, Preliminary Injunction, Jan. 24, 2012.

*Aevoe Corp.* v. *AE Tech Co., Ltd.*, USDC NV, Case No. 2:12-cv-0053-GMN-RJJ, Order (confirming and modifying the preliminary injunction), Mar. 7, 2012.

Request for Inter Partes Reexamination of U.S. Pat. No. 8,044,942, Control No. 95/002,073, Aug. 14, 2012.

Decision on Petition Under 37 CFR 1.181 & 1.927 on Inter Partes Reexamination, Control No. 95/001,881, Jun. 29, 2012.

International Search Report and Written Opinion, Appl. No. PCT/US2011/051344, Dec. 8, 2011.

Written Opinion of the International Preliminary Examining Authority, Appl. No. PCT/US2011/051344, Jul. 3, 2012.

Taiwanese Search Report, Appl. No. TW 100133098, Apr. 9, 2012.

European Search Report, Appl. No. EP 12171588, Oct. 10, 2012.

U.S. Appl. No. 13/352,196, filed Jan. 17, 2012.

U.S. Appl. No. 13/411,372, filed Mar. 2, 2012.

Non-Final Office Action dated Feb. 13, 2013, U.S. Appl. No. 13/411,372.

English translation of JP 2002-328613 (Nov. 15, 2002).

ZAGG invisibleSHIELD advertisement, 3 pages (undated but available from 2011).

Incipio Technologies, Screen Protectors, http://incipiotech.com/tag/screen-protectors, 3 pages (May 20, 2011).

Office Action issued Jun. 25, 2014 in U.S. Appl. No. 12/780,443.

Certified English Translation of JP2002-328613.

Examination Report mailed Jun. 1, 2015; in corresponding Great Britain patent application 1308829.9.

Examination Report mailed Nov. 10, 2014; in corresponding Great Britain patent application 1308829.9.

\* cited by examiner

TOUCH SCREEN PROTECTOR

FIELD OF THE INVENTION

The invention relates to a touch screen protector. In particular, it relates to a touch screen protector that can be easily attached and removed from a hand held electronic device that includes and is operable by a touch screen.

BACKGROUND OF THE INVENTION

With the ever increasing popularity of the touch screen hand held electronic devices came the demand for effective touch screen protectors. While the beautiful and glossy screen of touch screen hand held electronic devices such as iPad device looks great, in actual use, the amount of fingerprints left behind significantly damages the appearance and display quality of the screen. For this reason, the device is sold with a screen cleaning cloth. As frequent cleaning is not desirable, various screen protecting devices have been suggested.

Several kinds of touch screen protector are currently available. The ZAGG INVISIBLESHIELD™ product is a glare reduction touch screen protector. Its major drawback is the difficulty to apply the protector to a hand held device. The anti-glare INCIPIO™ screen protector often traps dust particles and bubbles even after meticulous cleaning and application. Other touch screen protectors currently available in the market are also unsatisfactory to the consumers, as a result of their tendency to trap air bubbles and dust, even with careful application. When in use, these touch screen protectors are in direct physical contact with the touch screen of the electronic device, either by static or application of adhesives. In the latter scenario, when the screen protectors are removed, diligent cleaning is needed to restore the touch screen to its shining luster. JP 2002328613 relates to a cover sheet comprising a transparent plastic film to protect a display screen, said cover sheet having a spacer comprising countless dots on a surface opposite the aforesaid display screen. U.S. Pat. No. 7,070,837 relates to a plastic film screen protector having a slightly roughened surface so that the majority of the film facing an electronic device screen does not substantially touch the screen. As a result, the roughened surface of the protector prevents interference patterns from arising when the film touches the screen.

None of these prior art devices has been found to be completely suitable, such that there is a need in the industry for a touch screen protector that is able to be installed easily and quickly without problems of trapping air bubbles or dust. One recent solution to the problem is disclosed in U.S. Pat. No. 8,044,942. This touch screen protector includes a plastic film that includes adhesive at its periphery in areas that correspond to non-touch sensitive areas of the touch screen. A spacer is provided between the touch screen adhesive and film, and the film is sufficiently flexible to provide touch contact with the touch screen for operation of the device.

In addition to the protector of U.S. Pat. No. 8,044,942, further improvements upon the art are desirable, and the touch screen protector of the present invention now provides one such improvement.

SUMMARY OF THE INVENTION

The invention relates to a touch screen protector for a hand held electronic device having a front face that includes a touch screen portion and a non-functional band. The touch screen protector of the invention comprises a film having front and back sides, an outer perimeter that corresponds to that of the front face of the device, and a transparent window that corresponds in size to the touch screen portion; an exposed adhesive or adhesive/spacer combination provided on the back side of the film along the outer perimeter of the film generally surrounding the transparent window; and multiple dots arranged in a prescribed pitch and present on the back side of the film at a density which is sufficiently high to reduce interference patterns when the transparent window of the protector is pressed against the touch screen portion for operation of the electronic device. In one embodiment, the exposed adhesive or adhesive/spacer combination has a thickness sufficient to space the film near but not in contact with the touch screen portion, and enables removably mounting the protector upon an outer perimeter of the front face to form a space between the transparent window of the film, the adhesive or adhesive/spacer combination and the touch screen portion of the device. Preferably, the dots extend from the film by a distance that is less than the thickness of the adhesive or adhesive/spacer combination, such that the dots do not contact the touch screen when the electronic device is not in use, and the transparent window can be pressed against the touch screen portion for operation of the electronic device while preventing direct contact of a user's fingers with the touch screen portion of the device and reducing visible interference patterns during use. In one preferred embodiment, no static cling is generated between the film and the touch screen portion of the device.

In some embodiments, the multiple dots are each made of a transparent material and are separated from adjacent dots by a distance between 0.1 and 10 mm. Preferably, the multiple dots are laid out in a grid or other pattern for ease of use, ease of manufacture, and to improve the viewer's perspective while providing an otherwise crystal-clear viewing experience.

The film may also include micro-particles adhered to the front side of the transparent window in an amount effective for providing anti-glare and anti-static effects to the window. In one embodiment, micro-particles are present on the back side of the film at a density which is sufficiently high to assist in providing an anti-static effect without adversely affecting quality of images viewed through the window.

In another embodiment, the exposed adhesive or adhesive/spacer combination has a thickness of between about 0.05 and about 1 mm, and the film has a thickness of between 0.1 and 2 mm and includes an opaque band about its periphery that receives the exposed adhesive or adhesive/spacer combination. Typically, the exposed adhesive or adhesive/spacer combination is present to provide coverage of at least 20% of the area of the non-functional band of the touch screen. Preferably, coverage of at least 50% of that area is provided in either a continuous or discontinuous, uniform or non-uniform design.

The touch screen protector may further comprise a color coating placed adjacent the perimeter of the protector and in line with the non-functional band of the device. This coating can match the color of the non-functional band or it can be a contrasting color such that the application of the protector changes the color of the non-functional band of the device.

In another embodiment, the touch screen protector of the invention further comprises a backing member to protect the back side of the film and the exposed adhesive prior to use. Preferably, the backing member further includes a tab to assist in the removal of the backing member when mounting the protector on the device.

In yet another embodiment, the touch screen protector of the invention further comprises one or more alignment holes or notches that match or accommodate one or more buttons on the electronic device to facilitate mounting of the protector on the device.

In another embodiment, the touch screen of the device and the film are each substantially rectangular and the touch screen is part of a telephone, reading device, music device, viewing device or navigation device.

In yet another embodiment, the film includes at least two layers, and the transparent window is clear but includes a coating that provides a matte effect or a privacy screen feature.

In another preferred embodiment, the film of the touch screen protector is a plastic film.

The invention also provides a method for protecting a touch screen of a hand held electronic device having a front face that includes a touch screen portion and a non-functional outer perimeter. In one embodiment, the method comprises providing a touch screen protector of the invention and removably attaching the touch screen protector upon the outer perimeter of the front face of the device via the exposed adhesive to form a space between the transparent window of the film, the adhesive or adhesive/spacer combination and the touch screen portion of the device. By using the method of the invention, the touch screen protector can be attached to the front face of the device without causing bubble formation between the transparent window of the film and the touch screen portion of the device.

The invention also provides an improvement for a hand held, touch screen electronic device having a front face that includes a touch screen portion and an outer perimeter that is non-functional, which comprises providing a touch screen protector of the invention for attachment to the front face of the device so that the touch screen protector can be attached without causing bubble formation between the transparent window of the film and the touch screen portion of the device.

DETAILED DESCRIPTION OF THE INVENTION

Figure 1A:
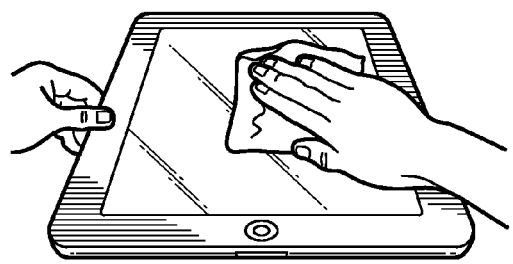
FIGS. 1A-D are schematic diagrams of assembling a touch screen protector of the invention with an iPad device.

The following definitions are used in this disclosure:

The term "near" as used herein means close in distance but not in physical contact, preferably about or less than 1 mm apart.

The term "periphery" as used herein means the outermost part or region within a precise boundary.

The term "non-functional band" as used herein means the area that surrounding the touch screen portion of the hand held electronic device which is made of a different material or made of the same material as the touch screen portion but is not touch sensitive.

The term "front face" of the device refers to the exposed surface of the device. The touch screen is generally made of a single glass sheet that includes the exposed surface for both the operable touch screen portion and the non-functional band around the perimeter of the touch screen portion.

The term "matte" as used herein means a surface finish which reflects back only a small portion of the incident light shined upon it.

The term "anti-static" is used to mean that the film does not generate static electricity when contacted or rubbed by the user.

The term "spacer" as used herein means an element/elements for creating a space.

The term "transparent window" is used to mean the see-through area of the film corresponding to the touch screen portion of the electronic device.

The term "removably mounting" as used herein means placing the touch screen protector on the device in such a way that the protector can be easily removed.

The term "micro-particles" is used to mean small elements on a surface of the touch screen protector.

The invention relates to a novel touch screen protector including a film, preferably a plastic film, and an exposed adhesive or adhesive/spacer combination provided along the outer perimeter of the film. Unlike most of the prior art touch screen protectors which are in direct physical contact with the touch screen, the touch screen protector of the present invention does not touch the operable portion of the touch screen. Such portion is referred to herein as the "touch screen portion." This critical feature of the present invention makes it possible for the screen protector to be 100% bubble free.

Although varying from device to device, the distance between the touch screen protector and the touch screen portion of the hand held device is determined by the thickness of the adhesive, which is less than that of the film. In a preferred embodiment, the adhesive or adhesive/spacer combination of the present invention has a thickness that is less than that of the film and is between about 0.05 and about 1 mm, and preferably about 0.05 to about 0.15 mm. The spacing can be as small as possible provided that the protector is not in contact with the touch screen portion when the device is not in use. The stiffness of the film contributes to the desired spacing as the stiffer the film is, the closer the spacing can be. However, the film should not be so stiff as to hinder the user's ability to operate the touch screen portion. The preferred dimensions and properties disclosed herein achieve these features.

The film has front and back sides, an outer perimeter that corresponds to that of the device, and a transparent window. The light transmission of the transparent window is preferably more than 60%, more preferably more than 75%, and most preferably more than 85%. In one preferred embodiment, the film has a thickness of between about 0.15 and about 2 mm and includes an opaque band about its periphery.

The film is sufficiently hard or stiff so that it does not bend or collapse under its own weight to contact the touch screen portion when the protector is applied onto the handheld device and the device is placed horizontally on a flat surface. Preferably, the hardness of the film is more than 1H, as assayed by Pencil Hardness Test. More preferably, the hardness of the film is more than 2H. Most preferably, the hardness of the film is more than 3H. The film is also sufficiently thin to be elastic so that, to operate the touch screen portion, all that is necessary is a gentle force from a user's finger to press any point of the transparent window of the film against the touch screen portion of the hand held device. The film can be made of any suitable transparent material available. In one embodiment, the film is made of a transparent material selected from the group consisting of polyester, polyethylene, polypropylene and polycarbonate. Preferably, the film is a plastic film made of polyethylene terephthalate (PET).

Multiple dots made of a transparent material are present on the back side of the film, i.e., the side of the film facing the touch screen, to reduce the occurrence of the interference patterns (Newton's rings). Furthermore, these dots eliminate partial static cling that interferes with touch screen sensitivity. In one embodiment, the dots are made of the same material as the film. Although the dots can be provided randomly, it is preferable to arrange them at a prescribed pitch in the transparent window of the film. In one embodiment, the distance between two adjacent dots are 0.1 to 10 mm. The dots may be of any shape, including round, spherical, oval, cylindrical, polygonal, conical or combinations thereof. Importantly, the height of the dots, i.e., the distance between the tip of the dot and the back of the film, is smaller than the thickness of the exposed adhesive or adhesive/spacer combination such that the dots do not contact the touch screen portion when the protector is applied onto the handheld device and the device is placed horizontally on a flat surface and not in use. In one embodiment, the dots have a height of between 0.003 and 1 mm, preferably between 0.05 to 0.9 mm. When a spacer is present, the dots extend from the film by a distance that is less than the thickness of the adhesive/spacer combination. In one preferred embodiment, each dot is a half sphere, attached to the back side of the film with its flat surface. Preferably, the radius of the sphere is 0.05 to 0.9 mm. Since the dots are preferably made of a transparent material, they do not negatively affect the visibility through the transparent window. As dots do not contact the touch screen when the electronic device is not in use, interference patterns are reduced when the touch screen is viewed prior to or during operation. As the dots only touch the screen when the protector is pressed, they keep the film from clinging on to the screen after it has been depressed by a finger as is a common problem with protectors that are adhered to or are otherwise in constant contact with the touch screen. In the present invention, the protective film is in effect "floating" above the screen, with the dots not touching the screen until the film is depressed against the screen by the user's finger.

In one embodiment, the film is coated to have a "matte" or anti-glare effect. Surface treatment such as EZ-GLIDE™ surface treatment further allows better touch screen portion maneuverability and effectively reduces finger glide friction on the touch screen portion of the hand held device. While prior film products that were to be handled by users may have been considered to require a treatment to reduce electrostatic charges due to rubbing contact, the present inventors found that the provision of an EZ-GLIDE™ micro-particle surface treatment on the back side of the film, i.e., the side of the film facing the touch screen portion, reduces the generation of interference patterns (or Newton's rings) when the protector is pressed against the touch screen portion by the user's finger or fingers. In addition to this desirable anti-Newton ring effect, the EZ-GLIDE™ micro-particle surface treatment on the back side of the film also prevents or avoids producing static electricity effects between the screen protector and the touch screen portion.

The micro-particles are not in physical contact with the touch screen portion unless the screen protector is pressed against the touch screen portion. As a result of the anti-static effects of the micro-particles, the screen protector will quickly bounce back or pull away from the touch screen portion once it is no longer pressed against it. The micro-particles on the back side of the film can be of various shapes, such as the column shape and the wave shape. The density of micro-particles are optimized such that they are high enough for providing anti-static effects but not too high as to adversely affect the quality of images that are viewed through the window. Preferably, the micro-particles cover more than 5% of the film. More preferably, the micro-particles cover more than 8% of the film. Most preferably, the micro-particles cover more than 10% of the film. If desired, the entire film of the protector can be covered with micro-particles, but good results can also be achieved if only up to 50% of the entire film is covered. The micro-particles can be made of any transparent material commonly known in the art. Preferably, the micro-particles are made of PET so that they are compatible with the film material. It is most preferable for the film of the screen protector of the present invention to include micro-particles on both sides so that both the front and back surfaces of the film do not generate static electricity during use.

In one embodiment of the invention, the touch screen protector reduces visible interference patterns during use, as a result of having multiple transparent dots present at the back side of the film. In another embodiment of the invention, the touch screen protector reduces visible interference patterns during use, as a result of having both micro-particles and multiple transparent dots present at the back side of the film.

The touch screen of most electronic devices has a non-functional opaque band, which creates a perimeter border. The screen protector of the present invention is designed so that the exposed adhesive can adhere to this border such that the transparent window enables the full operative portion of the touch screen portion to be used. The opaque band on the film more or less corresponds to the non-functional band of the front face of the device. In one embodiment, an opaque coating is printed on the back side of the film before applying the exposed adhesive or adhesive/spacer combination. In another embodiment, the opaque coating is printed on the front side of the film. The thickness of the opaque print coating is between about 0.0005 and 0.015 mm (0.5 to 1/0.5 microns) and preferably is about 0.001 mm (1 micron). In some embodiments, the opaque coating is printed on the back side of the film; the height of the dots is less than the combined thickness of the print coating and the exposed adhesive or adhesive/spacer combination.

The opaque coating can be printed in different colors to either match with or contrast with the color of the non-functional border on the front face of the device. In one embodiment, the color of the opaque coating is white, so as to match the white color of the front face of the device, or to contrast with the black color of the front face of the device. In some embodiments, the color of the opaque coating is chosen to customize the appearance of the device. In some embodiments, the color of the opaque band is the same as that of the exposed adhesive or adhesive/spacer combination. In other embodiments, the color of the opaque band is different from that of the exposed adhesive or adhesive/spacer combination. In one preferred embodiment, the opaque band is white and the exposed adhesive has a gray color.

To assure that the operative touch screen portion is not hindered, the adhesive or adhesive/spacer combination has a width that is less than that of the border wherever possible. To do this, the exposed adhesive or adhesive/spacer combination has a width that is 1 to 2 mm less than that of the opaque band. Thus, when the adhesive or adhesive/spacer combination is properly applied along the outer perimeter onto the back side of the film, it generally surrounds the transparent window but preferably does not touch the latter, thus facilitating proper operation of the touch screen portion of the device. It is not necessary for the adhesive or adhesive/spacer combination to form a sealed air pocket above the transparent window nor does it have to be applied to completely surround the window.

For devices that have non-functional boundaries that are not uniform, e.g., the iPod Touch, the adhesive of the protector can be configured in the same manner. It is also possible, although not preferred, to include the exposed adhesive only upon a portion of the perimeter, such as on top and bottom of a rectangular protector when the side boundaries of the touch screen are very small so that the protector can be mounted on the device without blocking or interfering with the functional touch screen portion of the device. The adhesive or adhesive/spacer combination is thus provided substantially along the side boundaries of the device. In particular, sufficient adhesive or adhesive/spacer combination is provided to hold the protector in a fixed position on the screen so that it does not slide or move out of position when touched by a user's fingers during operation of the device. Providing the adhesive or adhesive/spacer combination along portions of the side boundaries in a discontinuous or intermittent fashion is also acceptable provided that the adhesive is present on areas that amount to at least 20% and preferably at least 50% of the non-functional border. The width of the adhesive or adhesive/spacer combination may vary along the side boundaries as noted to correspond with the non-functional areas of the touch screen.

When the touch screen of the device has a non-functional band about its perimeter, the width of the adhesive or adhesive/spacer combination is preferably selected to conform to the width of the band so that the adhesive or adhesive/spacer combination does not interfere with the use of the touch screen portion when the protector is adhesively mounted onto the device.

When the spacer is present, it may include at least one opaque strip that is attached to the film by a joint adhesive, which has stronger adhesiveness than the exposed adhesive which attaches the touch screen protector to the touch screen. In one embodiment, the spacer comprises at least two strips; a first strip adhesively mounted upon the perimeter of the film and a second strip adhesively mounted upon the first strip whereas the second strip supports the exposed adhesive. The thickness of each strip is 0.05 to 0.5 mm, preferably 0.07 to 0.18 mm. In another embodiment, the spacer is a tape that includes a plastic film having adhesives on both front and back sides, with the adhesive on the side of the tape that faces the film being stronger than the adhesive that mounts the protector onto the touch screen of the device. The adhesive or adhesive/spacer combination has a thickness sufficient to space the film near but not in contact with the touch screen portion.

The exposed adhesive allows for removably mounting the protector upon the outer perimeter of the touch screen to form a space between the transparent window of the film, the adhesive or adhesive/spacer combination and the touch screen portion of the device. The exposed adhesive has sufficient adhesiveness to mount the protector onto the device but enables its removal without leaving adhesive residue on the device. Preferably, the exposed adhesive has an adhesive strength of 5-50 grams. Various adhesives of this type are commercially available and a skilled artisan can select the particular adhesive for the specific application of the protector to any particular device. An adhesive that allows for repeated cleaning and re-application is preferred so that the screen protector can be washed and reapplied repeatedly. Any commercial available washable and reusable adhesives can be used, such as adhesives made of silicone and polyurethane (PU). In one embodiment, the exposed adhesive is not made of acrylics. In one embodiment, the exposed adhesive is an opaque adhesive strip that is applied onto the back side of the film, preferably received by the opaque band of the film.

For some embodiments, the spacer can simply be an adhesive of the desired thickness. The protector film can be treated on its periphery so that the adhesive bonds more strongly to it than to the touch screen which is typically made of glass. This facilitates removal of the protector without leaving adhesive residue on the touch screen.

Preferably, the touch screen protector of the invention also comprises a backing member to protect the back side of the film and the exposed adhesive. The backing member may further include a tab to assist in the removal of the backing member when mounting the protector. By grasping and pulling on the tab, the backing member is easily removed from the protector to enable it to be mounted upon the device by contact of the exposed adhesive to the non-functional border of the touch screen of the device.

As many of these types of electronic devices include one or more operational buttons on the touch screen operative portion or border for performing functions such as on-off switching between internet browsers, photos, music or e-mail, the touch screen protector of the invention may further comprise one or more holes or notches that match or accommodate the one or more buttons on the electronic device. In addition to exposing the buttons for ease of operation, these holes or notches act as alignment features to facilitate proper mounting of the film on the touch screen.

Although the touch screen protector can be of any shape, they are preferably substantially rectangular to conform to the shape of current handheld devices, most of which have a substantially rectangular shape. In particular, the shape of the protector is not exactly rectangular as the corners are rounded to match those of the devices. Thus, the touch screen protector can be used to protect touch screens of many different kinds of handheld electronic devices, such as a mobile telephone, reading device, music device, viewing device or navigation device. Examples of such devices are iPhone, Nook, iPod, iPad, Droid, and GPS navigation systems. The nature of the protector and its design enable specific embodiments to be adapted to conform to the touch screen of any such device.

The touch screen protector of the present invention has the advantage of being able to be installed easily and quickly, e.g., within 30 seconds or less. This is a much simpler installation that a protector that has adhesive on the entire back side of the film. It is also advantageous in maintaining the film in position on the screen compared to protectors that are placed upon the screen without the use of adhesive. Also, as the touch screen protector of the present invention is to be gently applied to the non-functional border that typically surrounds the touch screen portion of a hand held device, there is no concern for leaving glue traces on the touch screen portion. Thus, the touch screen protector of the invention can be easily and readily removed without any adverse effect on the appearance and display quality of the touch screen portion of the hand held device.

Advantageously, when the hand held device is protected by the touch screen protector of the invention, fingerprint smudges on the touch screen portion are reduced, with minimal impact on the quality of the display, and the touch response of the screen. It would even allow the use of a capacitive stylus when using art applications on the hand held device.

In addition, the touch screen protector of the present invention also reduces the glare of a glossy touch screen portion. As a result, the photos on the touch screen portion look like prints. There is almost no effect on the crispness of the touch screen portion even though the glare is substantially removed. Owing to the finger print resistance feature of the touch screen protector of the present invention, smudge on the touch screen portion is substantially reduced.

EXAMPLES

Example 1

Protecting an iPad

Figure 1B:
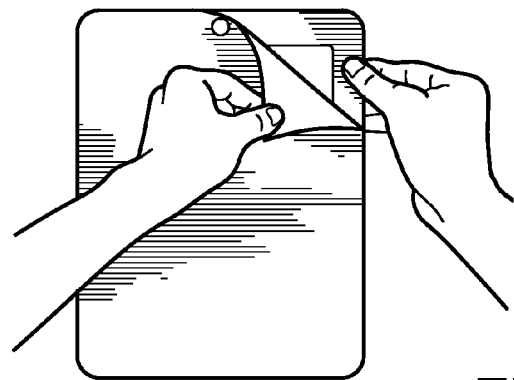
Figure 1C:
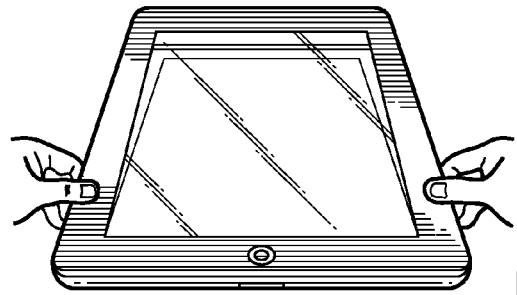
Figure 1D:
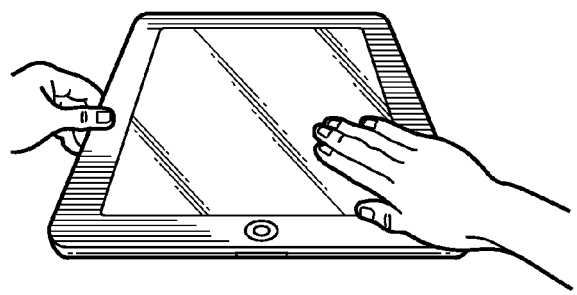

The protector of the invention may be made for use with Apple's iPad as an anti-reflective screen protector specifically designed to protect iPad's touch screen while reducing fingerprint smudging. The protector can be installed in seconds without any air bubbles, unlike other screen protectors that require tedious installation procedures and often result in unwanted air bubbles or hinder touch screen performance. As shown in the schematic diagrams of FIGS. 1A-D, the installation procedure is as follows. First, the screen of the iPad is cleaned by using the microfiber cloth included in the package to wipe away any dust particles on the iPad screen (FIG. 1A). Second, the backing member is peeled off gently before applying the plastic film to the non-functional boundary of the iPad screen (FIG. 1B). Third, the protector is aligned starting at the bottom, with the circular opening of the protector placed over iPad's "home" button (FIG. 1C). Finally, gentle pressure is applied around the borders of the protector so that it is secured in place on the iPad (FIG. 1D).

Figure 2:
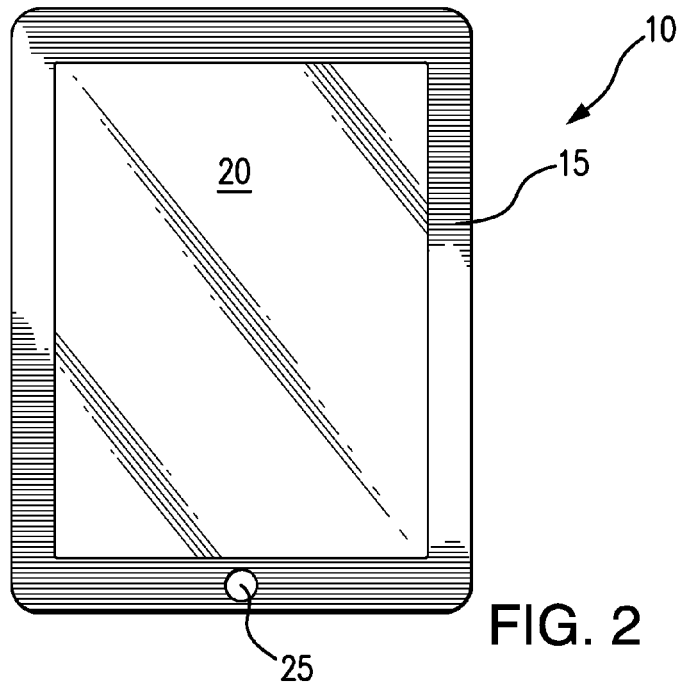
FIG. 2 is a front view of the touch screen protector of FIG. 1.
Figure 3:
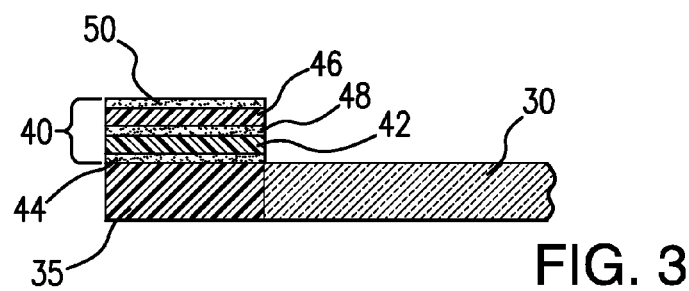
FIG. 3 is an expanded partial sectional view of the touch screen protector of FIG. 2 to illustrate a spacer comprising the exposed adhesive.
Figure 4:
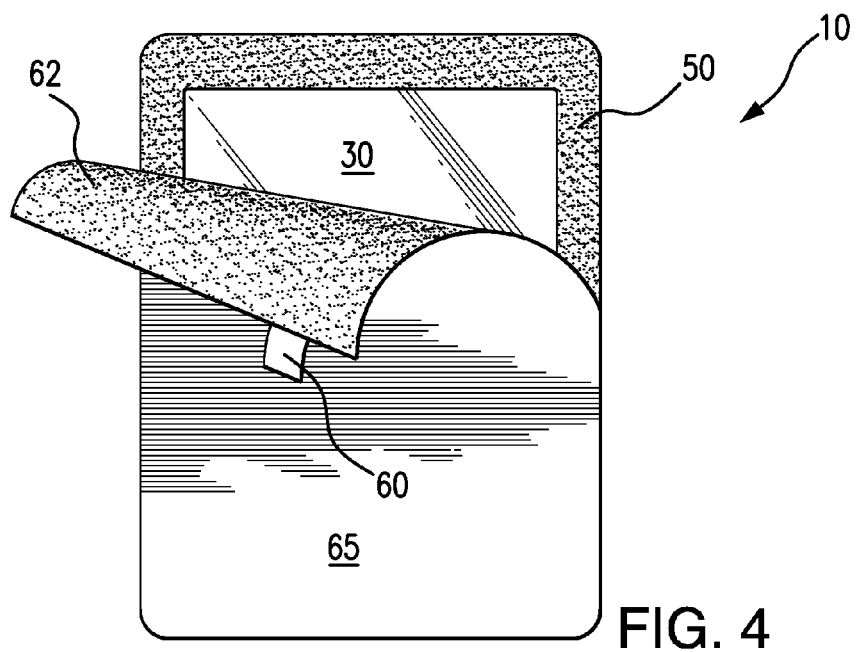
FIG. 4 is a back view of the touch screen protector with a portion of the backing member removed.

Further details of the protector and its construction are shown in FIGS. 2 to 4. As shown in FIG. 2, the protector 10 is generally rectangular and has an opaque band 15 around its perimeter. The band essentially conforms to the non-functional band that surrounds the touch screen of the iPad, while the transparent window 20 corresponds to the functional portion of the touch screen of the iPad. The protector includes a hole 25 that corresponds to the on-off selector button of the iPad. An adhesive/spacer combination providing an exposed adhesive is on the back side of the plastic film and is not visible due to the presence of the opaque band.

FIG. 3 is an expanded cross-sectional view of the adhesive/spacer combination. The plastic film is shown as 30 with the opaque band shown as 35. The adhesive/spacer combination is shown as 40 and it includes the first strip 42 adhered to the plastic film 30 by adhesive 44, and the second strip 46 adhered to the first strip 42 by adhesive 48. The exposed adhesive is shown as 50. Adhesives 44, 48 each has stronger adhesiveness than the exposed adhesive 50.

FIG. 4 is a view of the back side of the protector 10 as the backing member 65 is being removed for application of the protector to the iPad. As shown, tab member 60 has been pulled to detach backing member 65 from the exposed adhesive 50, thus showing the inside surface 62 of the backing member and the back side of the plastic film 30 behind the transparent window as well as the exposed adhesive 50 of the adhesive/spacer combination. The backing member 65 is completely removed before the protector 10 is applied to the iPad.

As the screen protector does not touch the touch screen portion of the iPad, it can be easily removed without leaving any residue on the touch screen portion. The adhesive also does not leave any residue on the non-functional border due to its relatively low adhesivity. The touch screen protector provide excellent touch screen portion maneuverability and scratch/smudge resistance while retaining optimal touch screen portion sensitivity and feedback.

Example 2

Protecting an iPhone 4

Another protector can be specifically adapted for Apple's iPhone 4 touch screen. The protector is sized to conform to the touch screen and is applied in a similar manner as for the iPad. First, the iPhone 4 is cleaned by using the microfiber cloth included in the package to wipe away any dust particles on the iPhone 4's screen. Second, the protector's backing member is peeled off gently before applying the plastic film to the boundaries of the iPhone touch screen. Third, the protector is properly aligned on top of the iPhone touch screen. Finally, pressure is gently applied around the borders of the protector to secure it in place. Again, the touch screen protector provides excellent touch screen portion maneuverability and scratch/smudge resistance while retaining optimal touch screen portion sensitivity and feedback.

Example 3

Plastic Films for the Touch Screen Protectors

The plastic films are made with the following specifications:

| | |
|---|---|
| Structure | HC (Matt) --- PET (188 μm) --- HC (Matt) |
| Total light transmittal | ≥89.0% |
| Haze | 10.5 ± 2.0% |
| Pencil Hardness | ≥3H |
| Steel wool abrasion test | No scratches |
| Adhesion | 0% Peel |
| Wetting tension test | ≥33 mN/m |
| Foreign matter contaminations | Diameter < 0.2 mm (ignored) Diameter ≥ 0.2 mm (≤0.5/m$^2$) |
| Scratch | None (W ≥ 0.1 mm & L ≥ 1.5 mm) |

To ensure the quality of the film, several tests such as cross cut tape test are carried out as follows:

First, cut the surface of the film with utility knife horizontally and vertically for 11 lines each to make one hundred 1 mm×1 mm squares on the film. Then, apply more than 20 mm long Nichiban Celofan Tape (Nichiban No. 405) on the cut surface and press with finger. Afterwards, pick up the tape end and remove the tape to 60° angle/0.5-1 mm to see if any coating comes off.

In both Examples 1 and 2, the protector can be removed for cleaning and re-application as necessary. The protector can be cleaned by rinsing with water and air drying. Small amounts of dishwashing detergent can be applied if necessary. Any debris or dust caught on the touch screen portion can be first brushed away. Once done rinsing, the protector is placed, adhesive side up, onto a towel and allowed to air dry. After it is completely dry and clean, it can be reapplied to the device.

What is claimed is:

1. A touch screen protector for a hand held electronic device having a front face that includes a touch screen portion and a non-functional band, the touch screen protector comprising:
 a film having front and back sides, an outer perimeter that corresponds to that of the front face of the device, and a transparent window that corresponds in size to the touch screen portion;
 an exposed adhesive or adhesive/spacer combination provided on the back side of the film along the outer perimeter of the film generally surrounding the transparent window, having a thickness sufficient to space the film near but not in contact with the touch screen portion, for removably mounting the protector upon an outer perimeter of the front face to form a space between the transparent window of the film, the adhesive or adhesive/spacer combination and the touch screen portion of the device, and multiple dots arranged in a prescribed pitch and present on the back side of the film at a density which is sufficiently high to reduce interference patterns when the transparent window of the protector is pressed against the touch screen portion for operation of the electronic device, wherein the dots extend from the film by a distance that is less than the thickness of the adhesive or adhesive/spacer combination, such that the dots do not contact the touch screen when the electronic device is not in use, and such that the transparent window can be pressed against the touch screen portion for operation of the electronic device while preventing direct contact of a user's fingers with the touch screen portion and reducing visible interference patterns during use.

2. The touch screen protector of claim 1, wherein the multiple dots are each made of a transparent material and are separated from adjacent dots by a distance between 0.1 and 10 mm.

3. The touch screen protector of claim 1, wherein the film also includes micro particles adhered to the front side of the transparent window in an amount effective for providing anti-glare and anti-static effects to the window.

4. The touch screen protector of claim 1, wherein the film comprises micro-particles present on the back side of the film at a density which is sufficiently high to assist in providing an anti-static effect without adversely affecting quality of images viewed through the window.

5. The touch screen protector of claim 1, wherein the exposed adhesive or adhesive/spacer combination has a thickness of between about 0.05 and about 1 mm, and the film has a thickness of between 0.1 and 2 mm and includes an opaque band about its periphery that receives the exposed adhesive or adhesive/spacer combination.

6. The touch screen protector of claim 1, wherein the exposed adhesive or adhesive/spacer combination is present to provide coverage of at least 50% of the area of the non-functional band of the touch screen.

7. The touch screen protector of claim 1 further comprising an opaque coating of a color placed adjacent the perimeter of the protector and in line with the non-functional band of the device.

8. The touch screen protector of claim 1, which further comprises a backing member to protect the back side of the film and the exposed adhesive prior to use.

9. The touch screen protector of claim 8, wherein the backing member further includes a tab to assist in the removal of the backing member when mounting the protector on the device.

10. The touch screen protector of claim 1, which further comprises one or more alignment holes or notches that match or accommodate one or more buttons on the electronic device to facilitate mounting of the protector on the device.

11. The touch screen protector of claim 1, wherein the touch screen of the device and the film are each substantially rectangular and the touch screen is part of a telephone, reading device, music device, viewing device or navigation device.

12. The touch screen protector of claim 1, wherein the film includes at least two layers, and the transparent window is clear but includes a coating that provides a matte effect or a privacy screen feature.

13. The touch screen protector of claim 1, wherein the film is a plastic film.

14. In a hand held, touch screen electronic device having a front face that includes a touch screen portion and an outer perimeter that is non-functional, the improvement which comprises providing a touch screen protector according to one of claim 1 for attachment to the touch screen portion of the device, wherein the touch screen can be attached without causing bubble formation between the transparent window of the film and the touch screen portion of the device.

15. The touch screen protector of claim 1, wherein the exposed adhesive or adhesive/spacer combination is present to provide coverage of at least 20% of the area of the non-functional band of the touch screen.

16. A method for protecting a touch screen of a hand held electronic device having a front face that includes a touch screen portion and a non-functional outer perimeter, which method comprises:

providing a touch screen protector comprising:
a film having front and back sides, an outer perimeter that corresponds to that of the front face of the device, and a transparent window that corresponds in size to the touch screen portion;

an exposed adhesive or adhesive/spacer combination provided on the back side of the film along the outer perimeter of the film generally surrounding the transparent window, having a thickness sufficient to space the film near but not in contact with the touch screen portion, and multiple dots arranged in a prescribed pitch and present on the back side of the film at a density which is sufficiently high to reduce interference patterns when the transparent window of the protector is pressed against the touch screen portion for operation of the electronic device, wherein the dots extend from the film by a distance that is less than the thickness of the adhesive or adhesive/spacer combination, such that the dots do not contact the touch screen when the electronic device is not in use, and such that the transparent window can be pressed against the touch screen portion for operation of the electronic device while preventing direct contact of a user's fingers with the touch screen portion and reducing visible interference patterns during use; and removably mounting the touch screen protector upon the outer perimeter of the front face of the device via the exposed adhesive or adhesive/spacer combination to form a space between the transparent window of the film, the adhesive or adhesive/spacer combination and the touch screen portion of the device, wherein the touch screen is attached without causing bubble formation between the transparent window of the film and the touch screen portion of the device.

\* \* \* \* \*